United States Patent [19]
Halterbeck et al.

[11] Patent Number: 5,334,440
[45] Date of Patent: Aug. 2, 1994

[54] WIRE-LINK BELT

[75] Inventors: Walter Halterbeck; Martin Huser, both of Duren, Fed. Rep. of Germany

[73] Assignee: Thomas Josef Heimbach GmbH & Co., Duren, Fed. Rep. of Germany

[21] Appl. No.: 910,820

[22] Filed: Jul. 9, 1992

[30] Foreign Application Priority Data

Jul. 10, 1991 [DE] Fed. Rep. of Germany ....... 4122805

[51] Int. Cl.$^5$ .................. D21F 7/12; D03D 25/00; B21F 27/08
[52] U.S. Cl. ........................ 428/222; 139/383 A; 139/383 AA; 162/358.2; 245/4; 245/6; 428/280
[58] Field of Search ............... 428/222, 224, 280, 294; 139/383 A, 383 AA; 162/358.2; 245/4, 6, 9

[56] References Cited

U.S. PATENT DOCUMENTS

| 2,276,099 | 3/1942 | Scherfel | 198/201 |
| 3,202,387 | 8/1965 | Andrews et al. | 245/6 |
| 3,920,117 | 11/1975 | Roinestad | 198/194 |
| 4,076,627 | 2/1978 | Friedrichs | 210/499 |
| 4,601,942 | 7/1986 | Finn et al. | 428/222 |
| 4,755,420 | 7/1988 | Baker et al. | 428/222 |
| 4,939,025 | 7/1990 | Nicholas et al. | 422/223 |
| 5,178,937 | 1/1993 | Janssen et al. | 428/222 |

FOREIGN PATENT DOCUMENTS

| 0018200 | of 1980 | European Pat. Off. . |
| 0128496 | of 1984 | European Pat. Off. . |
| 0211471 | of 1986 | European Pat. Off. . |
| 3015229 | of 1981 | Fed. Rep. of Germany . |
| 59-223346 | 12/1984 | Japan . |

Primary Examiner—George F. Lesmes
Assistant Examiner—Christopher Brown
Attorney, Agent, or Firm—Joseph W. Berenato, III

[57] ABSTRACT

A wire-link, such as a filament-link belt for process purposes, in particular one serving as a clothing for paper-making machines, with a plurality of juxtaposed, mutually engaging wire-coils comprising end-arcs enclosing plug-in wires and turn-legs connecting the arcs, is characterized in that the turn-legs of at least a part of the wire-coils alternate each time between two end-arcs at least once between the flat sides of the wire-link belt.

17 Claims, 4 Drawing Sheets

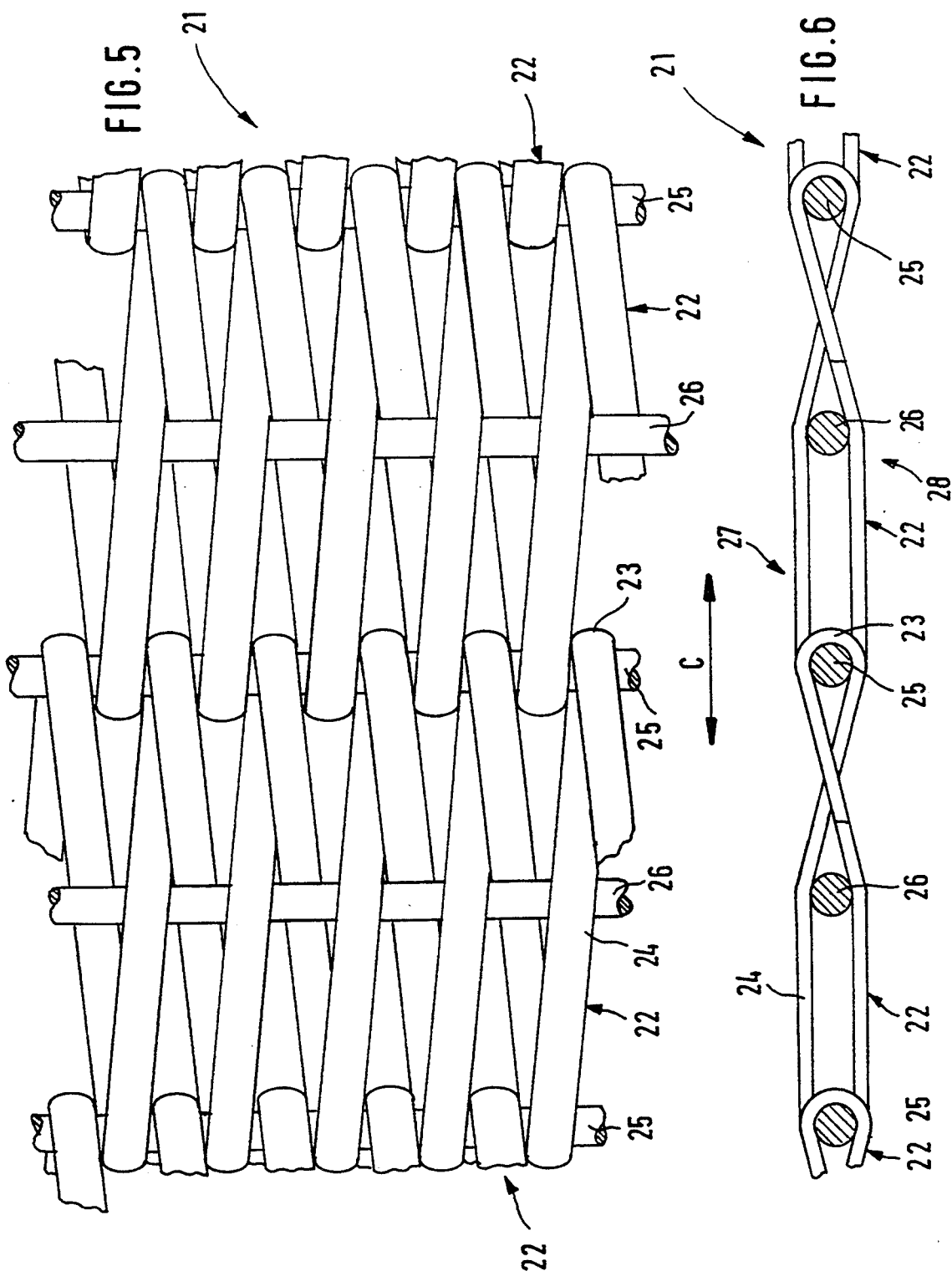

WIRE-LINK BELT

DESCRIPTION

The invention concerns a belt made of links of filaments, or wires, ie a wire-link belt for process purposes, in particular as a papermaking machine clothing, with a plurality of juxtaposed and mutually engaging coils of wire, i.e. wire-coils comprising at their ends arcs, i.e. end-arcs crossed by inserted wires, i.e. plug-in wire, said end--arcs being connected by the legs of the turns of the said coils, i.e. by the turn-legs.

Proposals already have long been made to use such wire-link belts as clothing for papermaking machines in order to support and move by such means the paper web through the papermaking machine. However a wire-link belt suitable for papermaking machines was first made available only by the invention of the German Offenlegungsschrift 24 19 751. These wire-link belts are assembled from a plurality of thermosetting plastic wires juxtaposed in the direction of advance and extending transversely to it, the turns of one wire-coil being inserted into the gaps between the turns of the wire-coil already assembled, the overlap being implemented in such a way that a duct is produced into and through which is inserted a plug-in wire coupling the particular adjacent wire-coils. In this manner an endless wire-link belt can be made which, on account of the hinging nature of the particular adjacent wire-coils, is characterized by good adaptability.

Basically the wire of a wire-coil runs helically, the pitch possibly varying strongly within a coil. To achieve a smooth surface, the wire-coils of most wire-link belts are flattened. In this manner straightened turn-legs are obtained at the top and bottom sides of the wire-link belt, said legs each connecting end-arcs. As a rule the adjacent wire-coils overlap by their end-arcs and in the process loop the plug-in wire located there.

In a variation from the basic type known from the German Offenlegungsschrift 24 19 751, the wire-link belts also may make use of double-wire-coils, as disclosed in European patent document A 0 116 894. As regards these wire-link belts, the turns of any two adjacent wire-coils loop one another helically in such a way that plug-in wires are not required therein, rather they are only needed to connect the double-wire-coils. In this manner it is possible to eliminate half the plug-in wires.

The European patent document A 0 018 200 discloses wire-link belts of the most varied designs. Illustratively wire-link belts also may be made in double layers, the layers being connected by additional wire-coils looping both layers. Again this document leads to wire-coils extending each time over three adjacent plug-in wires and two adjacent wire-coils always extending across two plug-in wires. Moreover this document discloses how to link the particular adjacent wire-coils with more than two plug-in wires.

The wire-link belts known to-date inherently evince high permeability to air and transport much air with them. This is undesirable with fast-moving papermaking machines because intense air circulation is caused thereby that may destroy the paper web. The European patent documents A 0 128 496 and A 0 050 374 propose to solve this problem by introducing fillers into the cavity enclosed by the coil-turn-legs. However this entails additional manufacturing expenditures.

Another attempt to lower the air-permeability of a wire-link belt is to flatten the turn-legs at least at the side facing the paper web, that is, to make them wider than in the zone of the end-arcs and thereby to constrict the gaps between the turn-legs (see German patent 32 43 512). Aside the fact that the air volume entrained between the coil-turn-legs is not reduced, it is expensive to make such wire-coils.

Moreover it is known to provide such wire-link belts with an additional layer on at least the side facing the paper web, for instance in the form of a pinned or bonded fiber web (German Offenlegungsschrift 24 19 751, FIG. 3), in the form of a fabric (European patent document B 0 080 713) or in the form of perforated foils (European patent document B 0 211 471). Such additional layers are meant to achieve a more uniform surface and additionally to lower the air permeability to a desired value.

In all known wire-link belts, the thickness always is larger than the thickness of the plug-in wire plus twice the diameter of the wire-link belt. In particular as regards application in the drying part of a papermaking machine where the wire-link belts are mostly used, a low thickness of the wire-link belt however is desired to optimize heat transfer and hence drying efficiency. This would entail however a low speed differential between the paper web and the wire-link duct at high looping angles, such as may be the case in the first driving assembly with closed belt guidance.

Moreover the above reasons lead to the goal of minimizing the air volume entrained and transported along by the wire-link belt. Lastly there is also a need to increase the flexibility of wire-link belts so they may better hug the drying cylinders.

Accordingly it is the object of the present invention to so design a wire-link belt of the species known from the above cited documents that its thickness shall be minimal, that it transports less air and shall be more elastic.

This problem is solved by the invention in that the turn-legs of at least part of the wire-coils change at least once between the flat sides of the wire-link belt between every two end-arcs. Thus the basic concept of the invention is that at least a part of the turn-legs pass through a wire-coil between every two end-arcs and through the inside of the wire-link belt and in this manner change from one flat side to the other. As a consequence, and depending on the number of crossing turn-legs, the inside of the wire-link belt is filled with the material of the wire-coils and thereby the free inside volume is being reduced. The transported volume of air is substantially reduced thereby.

Another advantage is that—especially when all turn-legs are laid out in this manner—the thickness of the wire-link belt is minimized, namely to the thickness of the plug-in wire, plus twice the thickness of the wire used for the wire-coils. Crossing points being formed between two adjacent turn-legs passing through the inside of the wire-link belt, the bending ability of the wire-link belt is also improved between the plug-in wires, as a result of which the wire-link belt adapts better around reversing means such as rollers or the like. Lastly plug-in wire guidance is improved because the looping angle of the end-arcs exceeds 180°.

An additional advantage of the wire-link belt of the invention is that during heat setting every turn-leg passing through the inside of the wire-link belt also is made to pass on that side from which the heat is applied and hence is directly exposed to the heat of thermosetting. This is not the case for conventional wire-link belts because the turn-legs passing on the side away from heating are raised to a substantially lower temperature than the turn-legs on the other side.

The basic concept of the invention can be carried out in many varied embodiment modes. This is already the case when only a part of the turn-legs of a wire-coil or when the turn-legs of only a part of the wire-coils pass through the inside of the wire-link belt in the manner of the invention. However the wire becomes more uniform with respect to a number of properties when the turn-legs of all wire-coils alternate between the flat sides of the wire-link belt between every two end-arcs.

In the simplest embodiment mode, the turn-legs only alternate once between every two end-arcs, and the wire-coils fitted with these turn-legs only extend over two plug-in wires. Seen end on, the wire-coils then assume the shape of a lying FIG. 8. This embodiment mode is especially well suited to using only right-handed or only left-handed wire-coils, which simplifies manufacture. Furthermore much lower air permeability without resort to fillers is achieved thereby compared with conventional wire-link belts for the same structure except the path of the turn-legs.

The basic concept of the invention furthermore may be implemented by an embodiment mode wherein the wire-coils extend over at least three plug-in wires and comprise turn-legs alternating between the flat sides at least twice, preferably in every gap between two adjacent plug-in wires. This design accelerates assembly, though it also entails a slight drop in flexibility of the wire-link belt. As an alternative, when the wire-coils extend over at least three plug-in wires, the turn-legs run over at least two adjacent plug-in wires on one flat side of the wire-link belt. These wire-coils are a combination of conventional wire-coils with those of the invention. Thus the turn-legs run at least once inside the wire-link belt, thereafter however in conventional manner at one of the flat sides over at least two plug-in wires. Many combinations are possible in this field, namely also wire-coils conventionally extending turn-legs and wire-coils with turn-legs passing inside the wire-link belt. In this manner the wire-link belts can be matched optimally to the particular requirements.

In their simplest form, the embodiment modes with wire-coils extending over at least three plug-in wires will overlap only in the region of their end-arcs and the plug-in wires present there. Further plug-in wires are present between those which link two adjacent wire-coils and the turn-legs pass over them at the top and at the bottom sides. However these plug-in wires also are used within the scope of the invention to link at least partly the wire-coils by creating an overlap of at least two plug-in wires between the adjacent wire-coils in the manner illustratively shown in FIGS. 4, 5 of the European patent document A 0 018 200. As a result the wire-link belt becomes especially dense, there being much wire at the inside, and the air permeability and the entrained volume of air remain low. Appropriately the wire-coils extending over at least three plug-in wires overlap a number of plug-in wires that is less by one than the number of plug-in wires over which the wire-coils do extend. This configuration is especially dense.

Moreover all the embodiment modes known in the state of the art for conventional wire-link belts can also be implemented in the wire-link belt of the invention. Thus the invention is free of any restriction concerning the material and the cross-sectional shape of the wires of the wire-coils and plug-in wires, wire shapes also may be implemented such as are shown in the German patent 32 43 512 and in the European patent document A 0 211 471. Basically multilayer embodiments also are feasible, similar to the disclosures of the European patent document A 0 018 200, where not only the wire-coils restricted to the individual layers, but also the wire-coils used to bond the layers may comprise turn-legs passing through the inside. In the former case the flat sides as denoted herein also mean those formed by the individual layers because each layer may be viewed as its own wire-link belt. Preferably thermosetting plastics, for instance polyamides or polyesters, shall be used as the wire-coil and plug-in wire material.

Also the wire-link belt of the invention may be fitted with a deposit in the form of a fibrous batt, a fabric or a foil (see German Offenlegungsschrift 24 19 751; European patent documents A 0 080 713 and A 0 211 471). Nor are there any restrictions regarding the number of plug-in wires enclosed by the end-arcs. Where called for, additionally fillers may be placed in the remaining free spaces of the wire-link belt, for instance foams, textile filaments or cross-sectionally shaped wires.

The invention is elucidated by means of embodiments shown in the drawings.

FIG. 5 is a topview of a third wire-link belt,

FIG. 6 is a sideview of the wire-link belt of FIG. 5,

Figure 1:
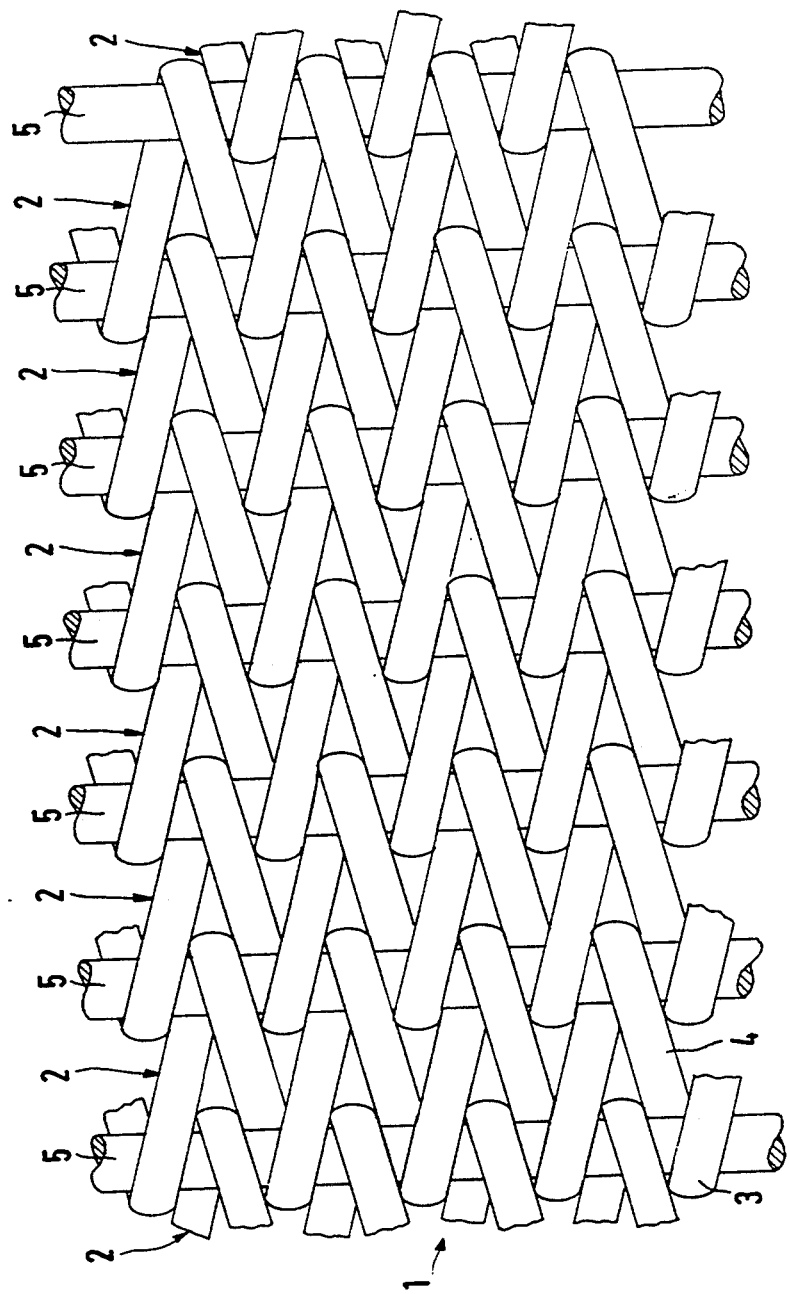
FIG. 1 is a topview of the wire-link belt of the invention.
Figure 2:
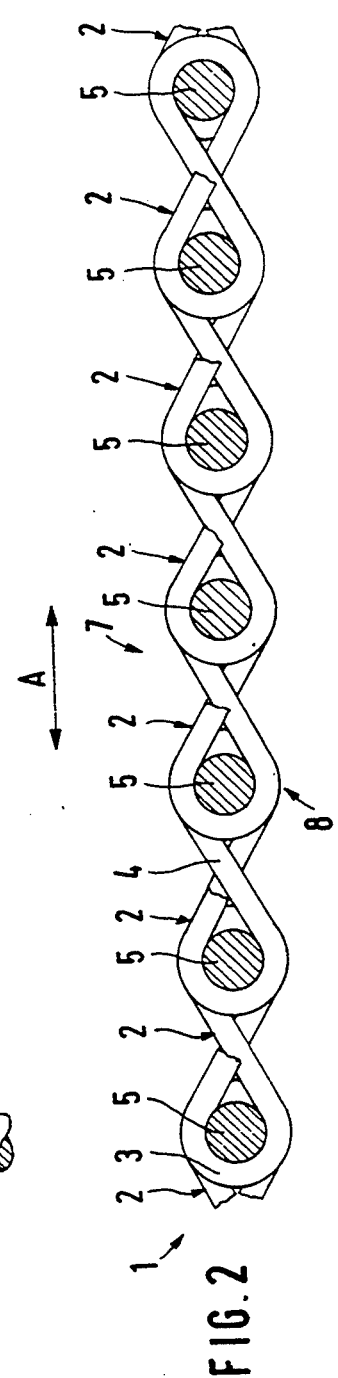
FIG. 2 is a sideview of the wire-link belt of FIG. 1.

The wire-link belt 1 shown in cutaway form in FIGS. 1 and 2 extends longitudinally in the directions of the double arrow A and is endless in these directions. Its transverse width is determined by the particular requirements.

The wire-link belt 1 comprises a plurality of juxtaposed wire-coils, all denoted by 2, and with axes located transverse to the belt longitudinal direction A. Each coil is composed sequentially of end-arcs illustratively denoted by 3 and of two turn-legs illustratively denoted by 4 each connecting two end-arcs 3, that is, each end-arc 3 is followed by one turn-leg 4 in turn followed by one end-arc 3. Every two adjacent wire-coils 2 overlap in the zone of their adjacent end-arcs 3 in such a way that a transverse duct is formed between these end-arcs 3. This duct is filled by an inserted, i.e. a plug-in wire—all of which are denoted by 5—and all plug-in wires 5 extend across the entire width of the wire-link belt 1. The plug-in wires are inside and resting against the end-arcs 3 looping them. The plug-in wires 5 act as hinges between two adjacent wire-coils 2.

The specialty of the shown wire-link belt 1 is that the turn-legs 4 pass through the inside of the wire-link belt 1, ie, they alternate between one flat side 7 and the other flat side 8. In concrete terms, this means that a particular turn-leg 4 after having passed by a plug-in wire 5 at its top side moves obliquely downward and loops the adjacent plug-in wire 5 in the region of the lower flat side 8. As a result the turns assume the shape of a prone FIG. 8, two adjacent turn-legs 4 crossing about midway between two plug-in wires 5. Consequently the resistance to bending between two plug-in wires 5 is substantially lowered and hence the wire-link belt 1 is able to substantially better hug guide rollers. Moreover, the inside space of the wire-link belt 1 is also substantially filled between the plug-in wires, so that the permeability to air is lowered and the volume of air entrained by the wire-link belt 1 is substantially decreased. Further, the wire-coils 2 are identical, that is their twist is in the same direction, and accordingly only one type of wire-coil 2 is required for manufacturing the wire-link belt 1. The wire-coils 2 themselves consist of a flat wire rectangular in cross-section. The larger dimension lies in the plane of the wire-link belt 1 and the smaller dimension is transverse to that plane. Applicable materials in particular are polyesters or polyamides.

Figures 3, 4:
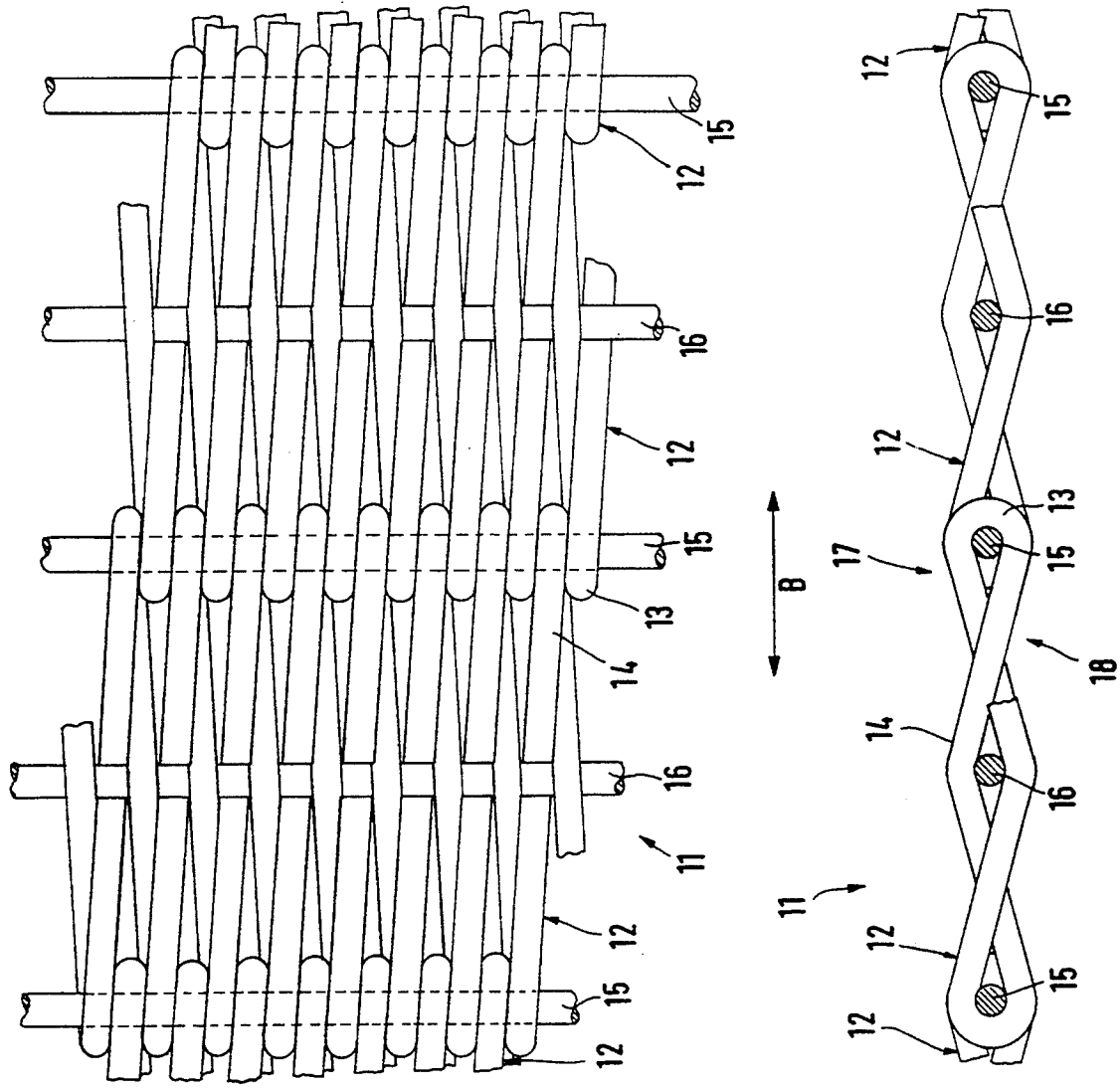
FIG. 3 is a topview of a further wire-link belt.
FIG. 4 is a sideview of the wire-link belt of FIG. 3.

The wire-link belt 11 shown in FIGS. 3 and 4 also comprises a plurality of wire-coils all denoted by 12 and mounted in longitudinally juxtaposed manner as indicated by the double arrow B and are composed of end-arcs illustratively denoted by 13 and of turn-legs connecting them and illustratively denoted by 14. The wire-coils 12 overlap in the zone of their end-arcs where they form ducts in the manner of the illustrative embodiment shown in FIGS. 1 and 2 for plug-in wires 15 acting as coupling wires and extending transversely to the longitudinal direction B. These plug-in wires 15 again form hinges in this embodiment between two adjacent wire-coils 12. An end-arc 13 of one wire-coil 12 always alternates with an end-arc 13 of the other wire-coil 12.

In this embodiment, the turn-legs 14 of the wire-coils 12 assume a shape such that, between two end-arcs 13, they alternate twice between the flat sides 17, 18 of the wire-link belt 11, that is, a particular turn-leg 14 beginning at an end-arc 13 in the zone of the upper flat side 17 passes obliquely downward through the inside of the wire-link belt 11 as far as the lower flat side 18 and then it rises to the upper flat side 17 until merging into the adjoining end-arc 13. The path reverses at each adjacent turn-leg 14. In this manner two adjacent turn-legs 14 cross twice between two end-arcs 13 and thereby form an additional duct extending approximately at the middle between the two end-arcs 13 and across the entire width of the wire-link belt 11, a further plug-in wire— each one which is denoted by 16—passing through said additional duct. The latter plug-in wire does not serve to connect, but instead stabilizes the path of the turn-legs 14 midway between two end-arcs 13.

As shown by FIGS. 3 and 4, much wire material is present inside this wire-link belt 11 also, as a result of which the air permeability and the entrained volume of air are decreased. Because of the lesser number of plug-in connection wires 15, this wire-link belt 11 is somewhat less flexible than the embodiment shown by FIGS. 1 and 2. However, there being two crossing points of the turn-legs 14 between the connection plug-in wires 15, this wire-link belt 11 too still is quite flexible and well hugs guide rollers.

FIGS. 5 and 6 show another embodiment mode of the invention, namely a wire-link belt 21 endlessly extending in the longitudinal direction as indicated by the double arrow C, with a defined width transversely thereto. The wire-link belt 21 comprises a plurality of longitudinally consecutive wire-coils all denoted by 22 of which the axes extend transversely.

The wire-coils 22 evince end-arcs illustratively denoted by 23 and turn-legs illustratively denoted by 24 which connect these arcs. The wire-coils 22 overlap in the zone of their end-arcs 23, namely alternatingly one end-arc 23 of one wire-coil 22 with one end-arc 23 of the adjacent wire-coil 22. In the zone of overlap, they loop each time a coupling plug-in wire, all of which are denoted by 25, so that a hinge-like articulation is present there. Further plug-in wires 26 are present, always at the middle, between the coupling plug-in wires 25, the latter plug-in wires 26 being similar to the plug-in wires 16 of the embodiment mode of FIGS. 3 and 4 and lacking any linking purpose.

The path of a particular turn-leg 24 shown slanting upward in FIG. 5 is such that it remains resting by a first segment against the left-side end-arc 23 in the zone of the lower flat side 28 and also passes the non-coupling plug-in wire 26. In its second segment the particular turn-leg 24 runs upward through the inside space of the wire-link belt 21 and merges into the right-side end-arc 23 at the upper flat side. The next turn-leg 24 again resting against this end-arc 23 runs in a first segment through the inside of the wire-link belt 21 from the lower flat side 28 to the upper flat side 27 and crosses the non-coupling plug-in wire 26 at the latter's top side. The turn-leg 24 then remains in a second segment in the zone of the upper flat side 27 and lastly merges into a left-side end-arc 23.

This design entails zones differing in properties. In the zone between the left-side end-arcs 23 and the non-coupling plug-in wire 25, the structure is similar to that of conventional wire-link belts with a large clear inside volume and substantial rigidity. In the next adjoining zone to the right between the non-coupling plug-in wire 26 and the right-side end-arcs 23, the segments of the end-arcs 24 present there do cross as a consequence of which this zone evinces substantially higher flexibility. Moreover the bulk of the wire is concentrated in the inner zone of the wire-link belt 21, that is, air permeability and entrained volume of air are less.

Figure 7:
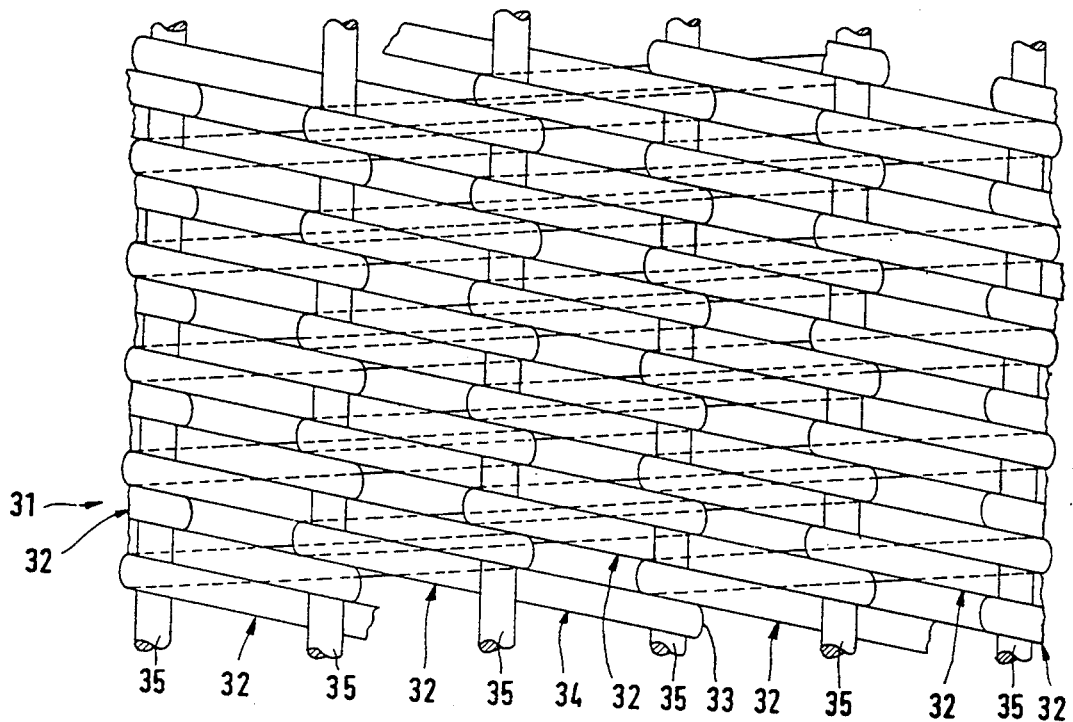
FIG. 7 is a topview of a fourth wire-link belt.
Figure 8:
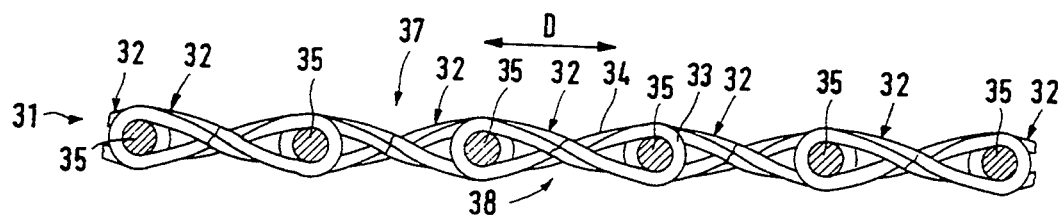
FIG. 8 is a sideview of the wire-link belt of FIG. 7.

The wire-link belt 31 shown in FIGS. 7 and 8 extends in the longitudinal direction in the manner indicated by the double arrow D and evinces a defined width transverse thereto. At first sight it shows great similarity to the wire-link belt 11 shown in FIGS. 3 and 4, however its essential difference is that the individual wire-coils overlap more in this embodiment.

The wire-link belt 31 comprises a plurality of wire-coils, each denoted by 32, which are juxtaposed in the longitudinal direction D, of which the axes run widthwise and of which the individual turns consist of end-arcs 33 and turn-legs 34 connecting said arcs. Plug-in wires each denoted by 35 are present at regular distances and extend transversely to the longitudinal direction D over the entire width of the wire-link belt 31.

In this embodiment mode, the overlap of two adjacent wire-link belts 32 is not restricted—contrary to the case of FIGS. 3 and 4—to the end-arcs 33, instead it extends each time to about half the length of a turn-leg 34, that is, the overlap is about 50%. Two adjacent wire-coils 32 therefore not only are provided with a common plug-in wire 35, but instead they have two. Seen in the direction of width, the end-arc 33 of a first wire-coil 32 alternates at one plug-in wire 35 with a turn-leg 34 of the directly adjacent—as seen in the direction of longitude D—second wire-coil 32 and an end-arc 33 of a third wire-coil directly adjacent in the longitudinal direction D to the second wire-coil 32. The particular plug-in wire 35 therefore assumes the coupling of the first and third wire-coil 32 and pure guidance for the turn-leg 34 of the second wire-coil 32.

The path of a turn-leg 34 does not differ from that of the embodiment mode of FIGS. 3 and 4, that is, a turn-leg 34 adjoining a right-hand end-arc 33 at the top flat side 37 passes through the inside of the wire-link belt 31 toward the lower flat side 38 and crosses the plug-in wire 35 at the underside of said lower flat side. Then the turn-leg 34 rises again toward the upper flat side 37 and there it merges into a right-hand end-arc 33. The turn-leg 34 adjoining said latter arc runs in the opposite way, that is, it begins at the lower flat side 38, crosses the wire-link belt 31, passes by the adjacent plug-in wire 35 at latter's top side and then returns to the lower flat side 38.

The shown wire-link belt 31 however is less flexible. On the other hand on account of the density of the mutually crossing turn-legs 34, the air permeability and the entrained volume of air are extraordinarily slight without need for special steps such as introducing fillers.

The embodiment modes shown in FIGS. 3 through 5 obviously also may be modified to the extent that the particular wire-coils 12, 22, 32 extend each time not only over three plug-in wires 15, 16, 25, 26, 35 but also over more than three. The overlaps then may be restricted to the end-arcs 13, 23, 33, but on the other hand they also may extend as far as in the embodiment mode of FIGS. 7 and 8. In this manner, merely by means of the path of the turn-legs, without any additional steps, it is possible to match the wire-link belts to the particular requirements of air permeability, entrained volume of air, flexibility and smoothness of surface.

We claim:

1. A wire link belt, comprising:
   a) a plurality of cooperating wire coils extending generally in the direction of the belt, each coil consisting of mutually facing first and second end arcs interconnected by a turn leg integral therewith and said coils defining spaced first and second flat surfaces of the belt;
   b) a plurality of plug-in wires extending in spaced relation transverse to the direction of movement of the belt; and
   c) each end arc disposed about an associated one of said plug-in wires so that adjacent coils may pivot thereabout and each turn interconnecting associated ones of said end arcs has at least a portion extending obliquely therebetween relative to said first and second surfaces so that permeability of the belt to air is minimized.

2. The belt of claim 1, wherein:
   a) said turn leg has a bent portion, the direction in which said turn leg extends changes at said bent portion, said bent portion being disposed about halfway between said plug-in wires about which each end arc is disposed;
   b) an intermediate plug-in wire is disposed adjacent said bent portion.

3. The belt of claim 2, wherein:
   a) each turn leg has a straight portion between an end arc and the associated intermediate plug-in wire so that each said straight portion is disposed parallel to the flat surfaces.

4. The belt of claim 2, wherein:
   a) each turn leg has first and second portions integral with said bent portion, and said first and second portion each extends obliquely relative to the flat surfaces between a plug-in wire about which an associated end arc is disposed and the associated intermediate plug-in wire.

5. The belt of claim 2, wherein:
   a) adjacent ones of said wire coils overlap across an associated two of the plug-in wires.

6. The belt of claim 1, wherein:
   a) each of said coils extends over at least three plug-in wires, and adjacent ones of said wire coils overlap fewer plug-in wires with adjacent ones of said wire coils than over which each of said coil extends.

7. The belt of claim 1, wherein:
   a) said wire coils are uniformly disposed in one of a right hand and a left hand orientation.

8. The belt of claim 1, wherein:
   a) each coil is comprised of a flat, thermosetting material.

9. The belt of claim 1, wherein:
   a) each coil is a lieing FIG. 8 in elevation.

10. A wire link belt, comprising:
    a) a plurality of cooperating wire coils extending generally in the direction of the belt, each coil consisting of mutually acing first and second end arcs interconnected by a turn leg integral therewith and said coils defining spaced first and second flat surfaces of the belt;
    b) a plurality of plug-in wires extending in spaced relation transverse to the direction of movement of the belt; and
    c) each end arc disposed about an associated one of said plug-in wires so that adjacent coils may pivot thereabout and the turn legs interconnecting associated ones of said end arcs has at least a portion extending obliquely therebetween relative to said first and second surfaces so that permeability of the belt to air is minimized.

11. The belt of claim 10, wherein:
    a) said turn leg has a bent portion, and first and second portions integral with said bent portion and extending in different directions relative to the flat surfaces, said bent portion being disposed about halfway between said plug-in wires about which each end arc is disposed;
    b) an intermediate plug-in wire is disposed adjacent said bent portion.

12. The belt of claim 11, wherein:
    a) each turn leg first portion extends between one of the plug-in wires about which an end arc is disposed and an associated intermediate plug-in wire parallel to the flat surfaces.

13. The belt of claim 12, wherein:
    a) one of said first and second turn leg portions extends parallel to the flat surfaces.

14. The belt of claim 11, wherein:
    a) adjacent wire coils overlap across at least two plug-in wires.

15. The belt of claim 11, wherein:
    a) each coil extends over at least three plug-in wires, and adjacent coils overlap fewer plug-in wires with adjacent ones of said wire coils than over which each coil extends.

16. The belt of claim 10, wherein:
    a) each of said coils is comprised of a flat, thermosetting material.

17. The belt of claim 16, wherein:
    a) each of said coils is disposed in one of a right hand and left hand orientation.

* * * * *